United States Patent [19]
Miki et al.

[11] Patent Number: 5,638,376
[45] Date of Patent: Jun. 10, 1997

[54] CODE DIVISION MULTIPLEX SIGNAL RECEIVING METHOD

[75] Inventors: Yoshinori Miki, Yokohama, Japan; Tadashi Matsumoto, Walnut Creek, Calif.; Toshirou Kawahara, Yokosuka, Japan

[73] Assignee: NTT Mobile Communications Network, Tokyo, Japan

[21] Appl. No.: 507,459

[22] PCT Filed: Apr. 21, 1995

[86] PCT No.: PCT/JP95/00791

§ 371 Date: Aug. 28, 1995

§ 102(e) Date: Aug. 28, 1995

[87] PCT Pub. No.: WO95/29535

PCT Pub. Date: Nov. 2, 1995

[30] Foreign Application Priority Data

Apr. 22, 1994 [JP] Japan .................................. 6-084867

[51] Int. Cl.⁶ .................................................. H04J 13/02
[52] U.S. Cl. .......................... 370/342; 370/441; 375/210; 375/346
[58] Field of Search ............................ 370/18, 342, 441; 375/205, 206, 208, 209, 210, 346, 348

[56] References Cited

U.S. PATENT DOCUMENTS

| | | | |
|---|---|---|---|
| 5,341,395 | 8/1994 | Bi | 375/205 |
| 5,345,468 | 9/1994 | Bi | 375/205 |
| 5,377,225 | 12/1994 | Davis | 375/205 |
| 5,500,856 | 3/1996 | Nagase et al. | 375/205 |

OTHER PUBLICATIONS

Asymptotic normality of the crosscorrelation of a CDMA system with phase drift, L.A. Rush and H.V. Poor, Proceedings of the Twenty-eighth Annual Conference on Information and Systems, Princeton, NJ Mar. 1994.
Narrowband Interference Suppression in CDMA Spread Spectrum Communications, L.A. Rush and H. V. Poor, IEEE Transactions on Communications, vol. 42, No. Feb. 3, 1994, part 3, pp. 1969–1979 Apr. 1994.
optimum Bandwidth for CDMA, Klein S. Gilhousen, International Conference on Personal, Mobile Radio, and Spread Spectrum Communications, Beijing, China. Oct. 1994.

Primary Examiner—Alpus H. Hsu
Assistant Examiner—Seema S. Rao
Attorney, Agent, or Firm—Pollock, Vande Sande & Priddy

[57] ABSTRACT

A determinant, which represents the relationship between a sequence of code division multiplexed transmission symbol vectors b(k) from L communicators and a sequence of despread output vectors y(k) of received signals taking into account the cross correlation between spreading code sequences of transmitted signals, is limited within the range of ±g symbol duration about symbol timing k, and despread outputs of received signals within the limited range are inputted into a 2g+1-stage shift register. On the other hand, partial correlation matrixes $R^{k+h}(1)$, $R^{k+h}(0)$ and $R^{k+h}(-1)$ for each symbol duration within the limited range are calculated by a partial correlation computing part with respect to $h=-g, \ldots, g$, then a correlation matrix $R^k$ between the spreading code sequences corresponding to the L communicators is derived from the partial correlation matrixes in an inverse matrix computing part and an inverse correlation matrix $R_k^{-1}$ of the correlation matrix is calculated. The inverse correlation matrix $R_k^{-1}$ and a sequence $Y^k$ of the despread outputs y(k) from the shift register are multiplied by a multiplier to obtain an estimated symbol vector sequence.

6 Claims, 5 Drawing Sheets

FIG. 1

$$\begin{bmatrix} \vdots \\ y(k-2) \\ y(k-1) \\ y(k) \\ y(k+1) \\ y(k+2) \\ \vdots \end{bmatrix} = \begin{bmatrix} 0 & R^{k-2}(1) & 0 & 0 & \cdots & & & & 0 \\ 0 & R^{k-2}(0) & R^{k-1}(1) & 0 & & & & & \\ 0 & R^{k-2}(-1) & R^{k-1}(0) & R^{k}(1) & 0 & & & & \vdots \\ 0 & 0 & R^{k-1}(-1) & R^{k}(0) & R^{k+1}(1) & 0 & & & \vdots \\ & & 0 & R^{k}(-1) & R^{k+1}(0) & R^{k+2}(1) & 0 & & \vdots \\ & & & 0 & R^{k+1}(-1) & R^{k+2}(0) & 0 & & \\ & & & & 0 & R^{k+2}(-1) & 0 & & \\ 0 & & & & \cdots & & & & 0 \end{bmatrix} \begin{bmatrix} \cdots & b(k-2) & b(k-1) & b(k) & b(k+1) & b(k+2) & \cdots \end{bmatrix}$$

$$+ \begin{bmatrix} \cdots & n(k-2) & n(k-1) & n(k) & n(k+1) & n(k+2) & \cdots \end{bmatrix} \quad \ldots (1)$$

FIG. 2

| #1 | --- | $b_1(k-2)$ | $b_1(k-1)$ | $b_1(k)$ | $b_1(k+1)$ | $b_1(k+2)$ | $b_1(k+3)$ | ----- |
|---|---|---|---|---|---|---|---|---|
| #2 | ----- | $b_2(k-2)$ | $b_2(k-1)$ | $b_2(k)$ | $b_2(k+1)$ | $b_2(k+2)$ | $b_2(k+3)$ | --- |
| #3 | ---- | $b_3(k-2)$ | $b_3(k-1)$ | $b_3(k)$ | $b_3(k+1)$ | $b_3(k+2)$ | $b_3(k+3)$ | -- |
| #L | ---- | $b_L(k-2)$ | $b_L(k-1)$ | $b_L(k)$ | $b_L(k+1)$ | $b_L(k+2)$ | $b_L(k+3)$ | -- |

FIG. 3

$$\begin{bmatrix} y(k-g) \\ y(k-g+1) \\ \vdots \\ y(k-1) \\ y(k) \\ y(k+1) \\ \vdots \\ y(k+g-1) \\ y(k+g) \end{bmatrix} = \begin{bmatrix} R^{k-g}(0) & R^{k-g}(-1) & 0 & \cdots & & & & & 0 \\ R^{k-g+1}(1) & R^{k-g+1}(0) & R^{k-g+1}(-1) & 0 & \cdots & & & & \vdots \\ 0 & \cdots & & \cdots & & & & & \vdots \\ \vdots & R^{k-1}(1) & R^{k-1}(0) & R^{k-1}(-1) & 0 & \cdots & & & \vdots \\ & & R^{k}(1) & R^{k}(0) & R^{k}(-1) & 0 & & & \vdots \\ & & 0 & R^{k+1}(1) & R^{k+1}(0) & R^{k+1}(-1) & 0 & & \vdots \\ \vdots & & & 0 & \cdots & & & & \vdots \\ \vdots & & & & \cdots & R^{k+g-1}(1) & R^{k+g-1}(0) & R^{k+g-1}(-1) & \\ 0 & \cdots & & & \cdots & 0 & R^{k+g}(1) & R^{k+g}(0) \end{bmatrix} \begin{bmatrix} b(k-g) \\ b(k-g+1) \\ \vdots \\ b(k-1) \\ b(k) \\ b(k+1) \\ \vdots \\ b(k+g-1) \\ b(k+g) \end{bmatrix} + \begin{bmatrix} n(k-g) \\ n(k-g+1) \\ \vdots \\ n(k-1) \\ n(k) \\ n(k+1) \\ \vdots \\ n(k+g-1) \\ n(k+g) \end{bmatrix} \quad \cdots (3)$$

$\exists_{k,k+1}$

26: PARTIAL CORRELATION MATRIX
    COMPUTING PART

27: INVERSE CORRELATION
    MATRIC COMPUTING PART

30: DECORRELATOR

CODE DIVISION MULTIPLEX SIGNAL RECEIVING METHOD

TECHNICAL FIELD

The present invention relates to a receiving method which is applied, for example, to mobile communications and by which a base station receives from L (where L is an integer equal to or greater than 2) communicators signals spectrum-spread by short- and long-period spreading code sequences and separates at least one of the received signals and, more particularly, to a receiving method which subjects a despreading code sequence of the received signal to decorrelation to obtain an interference-cancelled despread output.

PRIOR ART

Because of excellent interference resistance and security protection features of spread spectrum communication techniques, a code division multiple access (CDMA) communication system employing the spread spectrum communication scheme is now being studied more and more actively toward practical utilization in various communication systems. A problem of the CDMA system is a near-far problem that the power of a signal received by the district center greatly varies with the location of the communicator. In the CDMA system, since a plurality of communicators share the same frequency band, a signal transmitted from one of them becomes an interference wave which degrades the speech quality of a transmitted signal from another communicator.

For example, when a communicator near the base station and a communicator at a remote place simultaneously conduct communications, the signal from the former is received by the base station at a high power level, whereas the signal from the latter is received at a low power level. This means that the communication between the communicator at the remote location and the base station is seriously degraded by interference from the communication with the nearby communicator. As a solution to this near-far problem, there has been studied a transmitter power control scheme. With the transmitter power control scheme, the power of the signal that the receiving station receives, or the signal power versus interference power ratio which is determined by the received power, is controlled to be constant regardless of the location of the communicator, by which uniform speech quality can be obtained in the service area.

A typical communication system in which the near-far problem constitutes a main factor of the degradation of characteristics is a mobile communication system. In W. C. Y. Lee, "Overview of Cellular CDMA", IEEE Trans. VT, Vol. VT-40, pp. 291–302, 1991, there is analyzed how the ratio of areas in a zone over which communications can be made with predetermined speech quality (which ratio will hereinafter be referred to as a site ratio) is improved by the above-mentioned transmitter power control in the mobile communication system. Moreover, there has also been reported a trial calculation that the frequency utilization factor could be increased up to about 20 times higher than in the North American AMPS mobile communication system by the implementation of high-speed transmitter power control responsive to variations of fading which occurs in radio wave propagation environments of mobile communications (For more detailed information, see K. S. Gilhousen, I. M. Jacobs, R. Padovani, A. J. Viterbi, L. A. Weaver, Jr. and C. E. Wheatly III, "On the Capacity of a Cellular CDMA system," IEEE Trans. VT, Vol. VT-40, pp. 303–312, 1992).

However, the site ratio after the transmitter power control is greatly affected by control errors which are caused by various factors. For example, in E. Kudoh and T. Matsumoto, "Effect of Transmitter Power Control Imperfections on Capacity in DS/CDMA Cellular Mobile Radios," Proc. of IEEE ICC '92, Chicago, pp. 310.1.1–6, 1992, there is discussed the influence of control error on the relative frequency utilization factor in the aforementioned mobile communication system. This literature states that a 1 dB control error would decrease the relative frequency utilization factor down to 29% (up link) and 31% (down link).

On the other hand, Ruxandra Lupas and Sergio Verdu at Princeton University of the United States have recently revealed, with respect to a binary asynchronous CDMA system which is exposed to additive Gaussian noise, the class of a linear filter which permits the estimation of transmitted signals from signals received from respective communicators even if the received signals differ in power. The filter of this class is called an inverse-correlation filter. The amount of processing or throughput of this inverse-correlation filter increases only in proportion to the number N of simultaneous communicators and does not markedly increase exponentially. This is disclosed in R. Lupas and S. Verdu, "Near-Far Resistance of Multiuser Detectors in Asynchronous Channels," IEEE Trans. COM, Vol. COM-38, pp. 496–508, 1990 (hereinafter identified as Literature 1).

Another effect or advantage of the application of the CDMA scheme to the mobile communication system, other than the enhancement of the frequency utilization factor, is to make code-management-free communications a reality. That is, in order that the interference power from another communicator using the same frequency or the same time slot (hereinafter referred to as the same channel) may be kept below a predetermined level, a conventional FDMA or TDMA system reuses the same channel in a plurality of zones that are far enough apart from one another to avoid interference. To perform this, the conventional FDMA or TDMA system requires channel management for controlling the same channel interference. The channel management includes optimization as to how the service area is split into zones, as to how many channels are assigned to each zone and as to in which zone each channel is reused. This inevitably makes it difficult for a plurality of operators to operate different systems, using a certain frequency band.

In the case of the CDMA system, the "channel" corresponds to a spreading code. Accordingly, the magnitude of interference from a different channel corresponds to the magnitude of the cross correlation between spreading codes. Since the cross correlation between spreading codes does not become completely zero with respect to a plurality of spreading codes which are used in a given zone and a zone adjacent thereto, each channel in these zones suffers interference by other channels. In the CDMA system employing the spread spectrum communication scheme, such interference on the given channel by all the other channels of the same and other zones is regarded as equivalent noise and, in the course of despreading the received signal, a desired signal is extracted from their combined signal. In other words, as long as the interference from other communicators is regarded as the equivalent noise, there is no distinction between interference from the inside of the zone and interference from the outside of the zone. That is to say, a spreading code assignment problem does not arise in a mobile communication system which is designed to regard the interference from other communicators as equivalent noise. Hence, the code-management-free communication system can be realized. It is also possible for a plurality of operators to operate different systems through the use of the same frequency band when the systems are each designed to regard interference from other communicators as equivalent noise.

Then, in order to make it possible to regard interference from other communicators as equivalent noise, it is necessary to thoroughly randomize the spreading code sequence. This can be implemented by spectrum spreading with both of a short-period spreading code sequence whose period is the time length of one of information symbols to be transmitted and a long-period spreading code sequence whose period is the time length corresponding to a plurality of information symbols. In this instance, the short- and long-period spreading code sequences have the same chip rate, and the spectrum spreading with both spreading code sequences is accomplished by multiplying the long-period spreading code sequence for each chip after normal spreading with the short-period spreading code sequence, or by spreading with the short-period spreading code sequence after spreading with the long-period spreading code sequence.

It is also possible, theoretically, to configure the aforementioned decorrelator in a system which performs the spectrum spreading with the short- and long-period spreading code sequences as mentioned above. In the past, however, no concrete method has been proposed therefor.

An object of the present invention is to provide a code division multiplex signal receiving method by which the base station receives a plurality of asynchronous CDMA signals spread-spectrum with the short- and long-period spreading code sequences and detects the signal received from each communicator through inverse-correlation filtering.

DISCLOSURE OF THE INVENTION

The receiving method according to the present invention is a code division multiplex signal receiving method which receives from L communicators, L being an integer equal to or greater than 2, signals each spectrum-spread with the short- and long-period spreading code sequences and separates at least one of the received signals; the receiving method comprises the following steps:

(a) said received signals are despread with spreading code sequences for said L communicators, respectively, to obtain L despread output sequences;

(b) partial correlation matrixes $R^{k+h}(1)$, $R^{k+h}(0)$ and $R^{k+h}(-1)$ in L×L dimensions, representing the cross correlation of the spreading code sequences of said L communicators at respective symbol timings in the range of from (k−g)th to (k+g)th ones of k symbol timings, are calculated for h=−g, ..., 0, ..., g, k being a given integer and g a fixed constant equal to or greater than 1, then a correlation matrix $R_k$ in the range of said symbol timings, defined by the partial correlation matrixes, are generated and its inverse or negative correlation matrix $R_k^{-1}$ is calculated;

(c) said inverse correlation matrix $R_k^{-1}$ is multiplied by vectors of said L despread output sequences at said (k−g)th to (k+g)th symbol timings, obtained in said step (a); and (d) a decision is made of a symbol with respect to the results of said multiplication corresponding to at least one of said L communicators in said step (c).

In the above receiving method, the process of calculating said inverse correlation matrix $R_k^{-1}$ at each symbol timing k+1 after the symbol timing when said inverse correlation matrix was calculated in said step (b) comprises the following steps:

(i) partial correlation matrixes $R^{k+g}(-1)$ and $R^{k+g+1}(0)$ and the inverse correlation matrix $R_k^{-1}$ calculated at the symbol timing k are used to generate from said inverse correlation matrix an inverse correlation matrix $R_{k,k+1}^{-1}$ extended by one symbol timing; and (ii) said inverse correlation matrix $R_k^{-1}$ at the symbol timing k+1 is calculated from said extended inverse correlation matrix $R_{k,k+1}^{-1}$.

The present invention takes into consideration only the influence of the information symbol vector at the k-th symbol timing on the despread output vectors preceding and succeeding it, that is, only a period of time for sufficient convergence of the intersymbol interference and neglects the other symbol timings, thereby permitting the detection of the information symbol through decorrelation.

BRIEF DESCRIPTION OF THE DRAWINGS

FIG. 1 is a timing chart showing transmission symbol sequences by a plurality of communicators.

FIG. 2 is a diagram showing a determinant indicative of the relationship between transmission symbol sequences by a plurality of communicators, taking into account the cross correlation of spreading code sequences, and despread outputs of the corresponding received signals.

FIG. 3 is a diagram showing a determinant indicative of the relationship between transmission symbol sequences and despread outputs of the received signals on which the present invention is based.

BEST MODE FOR CARRYING OUT THE INVENTION

Figure 4:
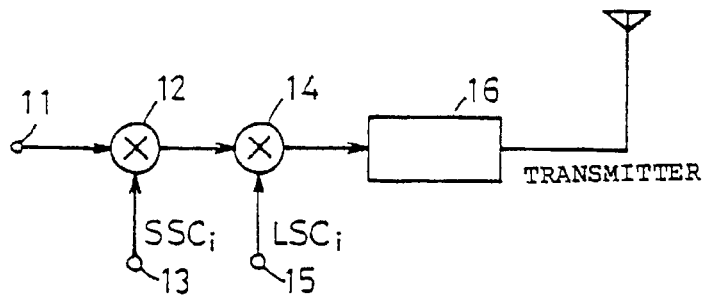
FIG. 4 is a block diagram illustrating the configuration of a transmitting side device for spread spectrum communications utilizing short- and long-period spreading code sequences.

The weightiest reason for which it is difficult to construct a decorrelator for the asynchronous CDMA system employing the short- and long-period spreading code sequences is that the cross correlation between the two sequences varies with time (or for each symbol). That is, in a CDMA system using only the short-period spreading code sequence, the cross correlation to another received signal in one symbol duration becomes the same for each symbol, but in the case where the received signal is spread by the long-period spreading code sequence, the cross correlations in respective symbol durations in the period of the long-period spreading code sequence differ from each other and vary. Now, consider the case where a base station simultaneously communicates with L (L being an integer equal to or greater than 2) communicators in asynchronous CDMA environments. It is understood from the aforementioned Literature 1 that vectors of despread outputs of received signals from the respective communicators in the receiving device of the base station, arranged in order of reception, $$Y=[\ldots y(k-2),y(k-1),y(k),y(k+1),y(k+2)\ldots]^t$$

is given by Eq. (1) shown in FIG. 1. In the above, y(k) indicates vectors of despread outputs $y_i(k)$ obtained by despreading the received signals from the respective communicators at the k-th symbol timing with both short- and long-period spreading codes in respective channels and arranged with respect to i=1 to L; the vectors are expressed by the following equation:

$$y(k)=[y_1(k),y_2(k),\ldots,y_L]^t, k\{-\infty,\infty\},$$

where t indicates a transposition. Furthermore, the following is a symbol vector array:

$$B=[\ldots b(k-2),b(k-1), b(k), b(k+1),b(k+2)\ldots]^t$$

where $b(k)=[b_1(k),b_2(k),\ldots,b_L(k)]^t$ is an information symbol vector at the k-th symbol timing. In FIG. 2 there are shown at rows #1 to #L information symbol sequences transmitted from communicators #1 to #L. In this instance, the received power of the signal from each communicator is normalized to 1 without losing generality.

It is evident that when the received power from each communicator differs, the information symbol vector b(k) needs only to be replaced by a weighted vector Wb(k), where the weighting factor W is an L×L orthogonal matrix. $n(k)=[n_1(k),n_2(k),\ldots,n_L(k)]^t$ is a noise vector. $R^k(0)$, $R^k(1)$, $R^k(-1)$ are partial correlation matrixes of the corresponding spreading code sequences of communicators from #i to #j (where $1 \leq i, j \leq L$) which form a complex space $C^{L \times L}$ in L×L dimensions, at the k-th symbol timing, and elements of these matrixes are given by the following equation:

$$R_{ij}^k(m)=\int S_i^k(t-\tau_i)S^*{}_j^k(t+mT-\tau_j)dt, \ m=-1,0,1 \quad (2)$$

where * indicates a complex conjugate, T the symbol length and ∫ an integration from −∞ to ∞ of the time t. Furthermore, $\tau_i$ is a relative delay time of the i-th communicator, which is set to $0=\tau_1 \leq \tau_2 \ldots \leq \tau_L < T$ without losing generality. These partial correlation matrixes satisfy the following equation:

$$R^k(-1)=R^{k+1}(1)^H$$

where H indicates a complex conjugate transposition. $S_i^k(t)$ is a spreading code sequence at the k-th symbol timing of the i-th communicator (the products of long- and short-period spreading code sequences in that symbol duration), and it is set to zero except in a symbol duration which is defined by a time duration [(k−1)T, kT]. Accordingly, the integration in Eq. (2) needs only to be conducted over the duration [(k−1)T, kT] in practice. Since the period of the long-period spreading code sequence is the time length of a plurality of symbols as referred to previously, the spreading code sequence $s_i^k$ differs for each symbol in a plurality of symbol durations.

Since the despread outputs Y of the signals from L communicators can be expressed by Eq. (1), the vector B in which pieces of transmitted information are arranged in order of reception can be determined by solving Eq. (1) after determining the vector Y in which the despread outputs are arranged in order of time. However, Eq. (1) is a linear equation of an unlimited dimension, and hence cannot directly be solved.

Then, by cutting out only parts influenced by the k-th symbol from respective terms of Eq. (1) without taking into account the aforementioned other symbol timings, we have Eq. (3) shown in FIG. 3. In this case, 2g+1 is a period of time within which the intersymbol interference sufficiently converges, and g needs only to be set to a fixed value in the range of from 2 to 4, for example; this is called a truncation length. Letting the despread output vector on the left-hand side of Eq. (3), the partial correlation matrix (hereinafter referred to simply as a correlation matrix) on the right-hand side, the symbol vector and the noise vector be represented by $Y^k$, $R_k$, $B^k$ and $N^k$, respectively, Eq. (3) can be expressed as $Y^k=R_k B^k+N^k$. Accordingly, letting an inverse matrix of the correlation matrix $R_k$ be represented by $R_k^{-1}$, the transmitted symbol vector $B^k$ can be expressed by the following equation:

$$B^k=R_k^{-1}Y^k-R_k^{-1}N^k \quad (4)$$

In a first embodiment of this invention method, the inverse matrix $R_k^{-1}$ (hereinafter referred to as an inverse correlation matrix) of the correlation matrix $R_k$ is calculated for each symbol timing and the despread output vector $$Y^k=[y(k-g),y(k-g+1),\ldots,y(k+g-1),y(k+g)]^t$$

is multiplied by the inverse matrix to obtain an estimated vector $$B'^k=[b'(k-g),b'(k-g+1),\ldots,b'(k),\ldots,b'(k+g-1), b'(k+g)]^t$$

of the information symbol vector $$B^k=[b(k-g),b(k-g+1),\ldots,b(k+g-1),b(k+g)]^t$$

As is evident from Eq. (4), if each element of the noise vector $N^k$ is sufficiently smaller than the despread output and the truncation length is sufficiently larger than it, the estimated vector B'(k) can be regarded as matching the information symbol vector B(k).

Incidentally, since Eq. (3) is a modified form of Eq. (1) which is used to estimate the information symbol vector b(k), there is no guarantee of accuracy in estimated values of symbol vectors b(k±1), . . . at the other symbol timings k±1, k±2, . . . , k±g which are simultaneously obtained by multiplying the vector $Y_k$ by the inverse correlation matrix $R_k^{-1}$. Therefore, for the estimation of the symbol vectors b(k±1), . . . , it is necessary that the inverse correlation matrix of Eq. (3) at other symbol timings be determined for each symbol timing. However, the matrix $R_k$ is a (2g+1)L by (2g+1)L matrix; the computation of the inverse matrix of such a large size for each symbol timing involves a significantly large amount of processing, and hence is not preferable from the practical viewpoint.

In a second embodiment of this invention method, the computation of the (2g+1)L by (2g+1)L inverse matrix is performed only once and, at each subsequent timing, the inverse correlation matrix is updated by the scheme described below, by which the computational complexity involved is extremely reduced. This scheme is called a sliding escalator algorithm.

Sliding Escalator Algorithm

Now, assume that the inverse correlation matrix $R_k^{-1}$ is preknown. Consider the determination of an inverse correlation matrix $R_{k+1}^{-1}$ one symbol timing after that $R_k^{-1}$. Referring to FIG. 3, matrixes, except the upper-left 2gL by 2gL partial matrix (in the broken-line block $3_{k, k+1}$) of the correlation matrix $R_{k+1}$, that is, one column of the rightmost partial correlation matrix and one row of the lowermost partial correlation matrix, match the lower-right 2gL by 2gL partial correlation matrixes in the correlation matrix $R_k$. Then, a (2g+2)L by (2g+2)L correlation matrix formulated with parts common to the correlation matrixes $R_k$ and $R_{k+1}$ overlapped, that is, a correlation matrix $R_{k, k+1}$ extended from the correlation matrix $R_k$ by one symbol timing, is given by the following equation (5):

$$R_{k,k+1} = \begin{bmatrix} & & & & 0 \\ & & & & \vdots \\ & & & & 0 \\ & & & & R^{k+g}(-1) \\ 0 \ldots 0 & R^{k+g+1}(1) & & & R^{k+g+1}(0) \end{bmatrix}$$

$$= \begin{bmatrix} R^{k-g}(0) & R^{k-g}(-1)\, 0 \ldots 0 \\ \hline R^{k-g+1}(1) & \\ 0 & \\ \vdots & R_{k+1} \\ \vdots & \\ 0 & \end{bmatrix}$$

Here, it is mathematically shown with ease that if the inverse correlation matrix $R_k^{-1}$ is used, the extended inverse correlation matrix $R_{k,k+1}^{-1}$ could be derived from the right-hand side of the first equality sign in Eq. (5) as expressed by the following equation:

$$R_{k,k+1}^{-1} = \begin{bmatrix} R_k^{-1} + R_k^{-1} r_k s_k r_k^H R_k^{-1} & -R_k^{-1} r_k s_k \\ -s_k^H r_k^H (R_k^{-1})^H & s_k \end{bmatrix} \quad (6)$$

where $$r_k = \begin{bmatrix} 0 \\ \vdots \\ 0 \\ R^{k+g}(-1) \end{bmatrix} \quad (7)$$

Furthermore, $$s_k = [R^{k+g+1}(0) - r_k^H R_k^{-1} r_k]^{-1} \quad (8)$$

Similarly, the extended inverse correlation matrix $R_{k,k+1}$ can be derived from the right-hand side of the second equality sign in Eq. (5) as expressed by the following equation:

$$R_{k,k+1}^{-1} = \begin{bmatrix} u_{k+1} & -u_{k+1}^H r_{k+1}^H (R_{k+1}^{-1})^H \\ -R_{k+1}^{-1} r_{k+1} u_{k+1} & R_{k+1}^{-1} + R_{k+1}^{-1} r_{k+1} u_{k+1} r_{k+1}^H (R_{k+1}^{-1})^H \end{bmatrix} \quad (9)$$

$$r_{k+1} = \begin{bmatrix} R^{k-g+1}(1) \\ 0 \\ \vdots \\ 0 \end{bmatrix} \quad (10)$$

Moreover, $$u_{k+1} = [R^{k-g}(0) - r_{k+1}^H R_{k+1}^{-1} r_{k+1}]^{-1} \quad (11)$$

This equation (9) is re-defined as follows:

$$R_{k,k+1}^{-1} = \begin{bmatrix} q_{k+1,k+1} & q_{k+1}^H \\ q_{k+1} & Q_{k+1} \end{bmatrix} \quad (12)$$

Comparing Eqs. (9) and (12), $$Q_{k+1} = R_{k+1}^{-1} + R_{k+1}^{-1} r_{k+1} u_{k+1} r_{k+1}^H R_{k+1}^{-1}$$

$$q_{k+1} = -R_{k+1}^{-1} r_{k+1} u_{k+1}$$

$$q_{k+1,k+1} = u_{k+1} \quad (13)$$

From this, $$Q_{k+1} = R_{k+1}^{-1} + q_{k+1} q_{k+1,k+1}^{-1} q_{k+1}^H \quad (14)$$

Therefore, $$R_{k+1}^{-1} = Q_{k+1} - q_{k+1} q_{k+1,k+1}^{-1} q_{k+1}^H \quad (15)$$

The inverse correlation matrix $R_k^{-1}$ is preknown as mentioned previously. A first step is to calculate partial correlation functions $R^{k+g}(-1)$ and $R^{k+g+1}(0)$ in Eqs. (7) and (8) through the use of Eq. (2). On the basis of the results of the calculation, Eq. (6) is calculated from Eqs. (7) and (8) to obtain an extended (2g+2)L by (2g+2)L inverse correlation matrix $R_{k,k+1}^{-1}$, and its lower right (2g+1)L by (2g+1)L partial matrix is obtained as $Q_{k+1}$ in Eq. (12). Furthermore, partial matrixes corresponding to $q_{k+1}^H$, $q_{k+1}$, $q_{k+1,k+1}$ in Eq. (12) are obtained from an L by (2g+1)L partial matrix above the above-mentioned partial matrix, a (2g+2)L by L partial matrix at the left and an L by L partial matrix at the upper left. These partial matrixes are used to calculate Eq. (15) to obtain the inverse correlation matrix $R_{k+1}^{-1}$. This is used to calculate $R_{k+1}^{-1} Y^{k+1}$ as an estimated value of the symbol vector b(k+1) at the symbol timing k+1. While the above description has been given of the case of obtaining the inverse correlation matrix $R_{k+1}^{-1}$ at the symbol timing k+1 on the assumption that the inverse correlation matrix $R_k^{-1}$ at the symbol timing k has already been obtained, this is exactly equivalent to obtaining the inverse correlation matrix $R_k^{-1}$ at the current symbol timing k on the assumption that the inverse correlation matrix $R_{k-1}^{-1}$ at the immediately preceding symbol timing k−1 has been obtained by replacing k with k−1.

Thus, once the correlation matrix $R_{k-1}$ in Eq. (3) shown in FIG. 3 is calculated, the inverse correlation matrix $R_k^{-1}$ need not be calculated directly from the correlation matrix $R_k$ thereafter and can be updated at each symbol timing through the use of the inverse correlation matrix $R_{k-1}^{-1}$ and the partial correlation matrixes $R^{k+h}(0)$ and $R^{k+g-1}(-1)$ at the immediately preceding symbol timing, by calculating Eqs. (6) and (15). The computation of Eq. (8) for $s_k$ involves the computation of an L by L inverse matrix and the computation of an L by L inverse matrix for obtaining $q_{k+1,k+1}^{-1}$ in Eq. (15); however, since the computational complexity for the inverse matrix computation increases with the cube of the matrix size, the amount of operation is significantly smaller than that for the inverse matrix computation of the correlation matrix $R_k$ which is a (2g+1)L by (2g+1)L.

In the above, the received power from each communicator has been described to be normalized to 1; when the received power differs with communicators, it is necessary only to employ a diagonal matrix W using the received power from respective communicators as diagonal elements and use Wb(k) in place of the information symbol vector b(k).

Figure 5:
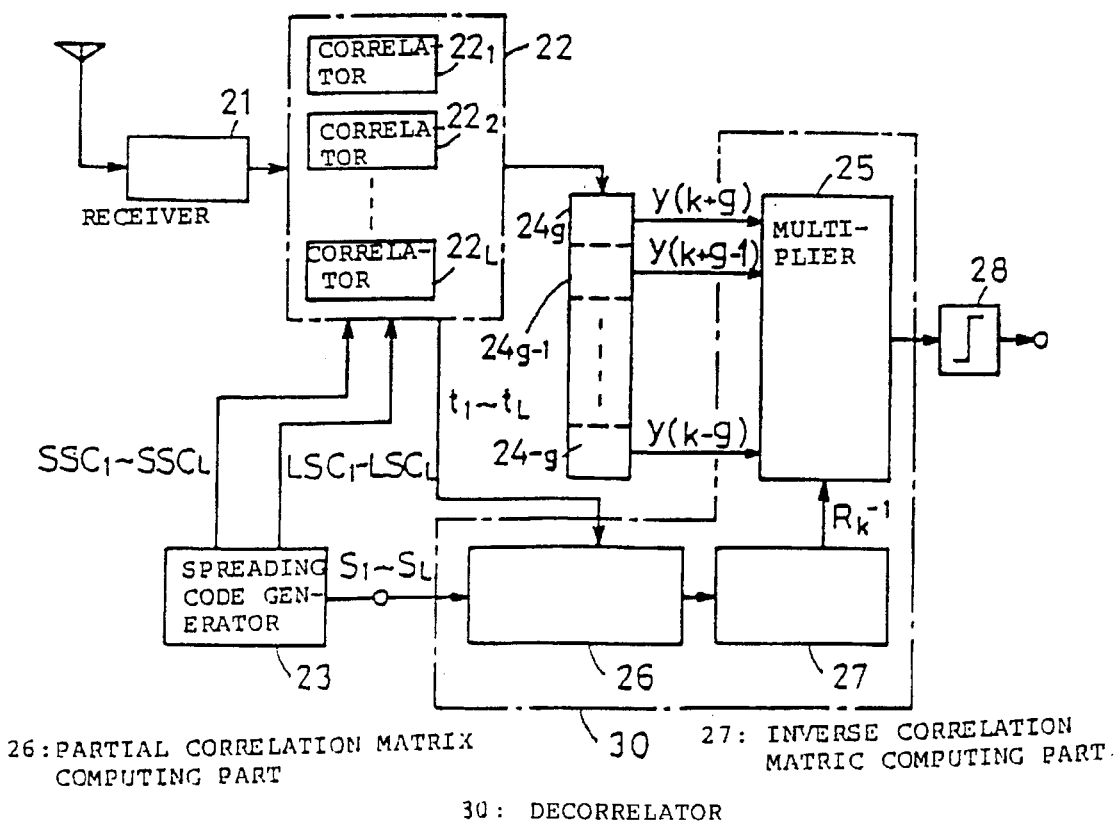
FIG. 5 is a block diagram illustrating an example of the configuration of a receiving device embodying the present invention.

In FIGS. 4 and 5 there are illustrated a transmitting device and a receiving device, respectively, for use in the code division multiplex communication system embodying the receiving method according to the present invention. In the transmitting device of each communicator #i, as shown in FIG. 4, transmission symbol information is fed via an input terminal 11 to a multiplier 12, wherein it is spectrum-spread by being multiplied by a short-period spreading code sequence $SSC_i$ fed via a terminal 13, then the spread output is provided to a multiplier 14, wherein it is further spectrum-spread by being multiplied by a long-period spreading code sequence $LSC_i$ fed via a terminal 15, and the spread output is transmitted as radio waves via a transmitter 16. The period of the short-period spreading code sequence $SSC_i$ is equal to the symbol duration T of the transmission information and the period of the long-period spreading code sequence $LSC_i$ is equal to the duration of a plurality of transmission symbols. The chips of the two spreading code sequences are synchronized with each other. The transmission information may also be spread first by the long-period spreading code sequence $LSC_i$ and then by the short-period spreading code sequence $SSC_i$. The configuration of the transmitting side is the same as in the past.

In the receiving device embodying the present invention, as shown in FIG. 5, spread spectrum signals from L communicators are received by a receiver 21 and the receiver output is fed to a despreader 22, wherein they are despread by matched filters or sliding correlators $22_1$ to $22_L$ with spreading code sequences $SSC_1$, $LSC_1$ to $SSC_L$, $LSC_L$ provided from a spreading code generator 23 in correspondence with the communicators #1 to #L, at timings $t_1$ to $t_L$ at which to maximize the correlation. The despread output vector composed of these L sequences of despread outputs is outputted for each symbol timing. The despread output vector at the k-th symbol timing is $y(k)=[y_1(k), y_2(k), \ldots, y_L(k)]^t$. This despread output vector y(k) is inputted into a First-in-First-out register of (2g+1) stages, that is, a shift register 24, and despread output vectors $y(k-g), \ldots, y(k+g)$ are held in its respective shift stages 24g to 24g and then supplied to a multiplier 25. The multiplier 25 forms a decorrelator 30, together with a partial correlation matrix computing part 26 and an inverse correlation matrix computing part 27.

On the other hand, the spreading code generator 23 generates products $LSC_1.SSC_1$, $LSC_2.SSC_2, \ldots, LSC_L.SSC_L$ of pairs of long- and short-period spreading codes corresponding to the communicators #1 to #L and provides them as spreading codes $s_1$ to $s_L$ to the partial correlation matrix computing part 26. The partial correlation matrix computing part 26 computes relative delay times $\tau_1$ to $\tau_L$ of all the communicators #i=1, ..., L on the basis of timing signals $t_1$ to $t_L$ fed from the correlator 22 and computes, by Eq. (2), a partial correlation matrix of every combination (i,j) of the communicators on the basis of the spreading code sequences $s_1$ to $s_L$ fed from the spreading code generator 23. In this instance, according to the aforementioned receiving method of the present invention, all partial correlation matrixes $R^{g+h}(1)$, $R^{g+h}(0)$ and $R^{g+h}(-0)$ at the symbol timings k+h, h=−g, ..., g are calculated by Eq. (2) and provided to the inverse correlation matrix computing part 27. The inverse correlation computing part 27 generates a correlation matrix $R_k$ composed of all the partial correlation matrixes, then computes an inverse correlation matrix $R_k^{-1}$, which is inverse from the correlation matrix, and provides it to the multiplier 25. The multiplier 25 obtains the product of the inverse correlation matrix $R_k^{-1}$ and the despread output vector $Y^k$ as estimated symbol vector information $b'(k-g), \ldots, b'(k+g)$; respective components $b_1'(k), \ldots, b_L'(k)$ of the vector b'(k) at the symbol timing k are level-decided by a decider 28 and the results of the decision are outputted as decoded symbols of the signals received from the communicators #1 to #L.

In the case of employing the aforementioned sliding escalator algorithm which is a second receiving method of the present invention, the partial correlation matrix computing part 26 computes, by Eq. (2), partial correlation functions $R^{k+g+1}(-1)$ and $R^{k+g}(0)$ in Eqs. (7) and (8) (assume that k in the equations which will hereinafter be referred to is replaced with k−1) with respect to combinations of all the communicators on the basis of the spreading code sequences $s_1$ to $s_L$; the partial correlation functions thus obtained are provided to the inverse correlation matrix computing part 27. The inverse correlation matrix computing part 27 calculates Eqs. (7) and (8), using these partial correlation matrixes and the inverse correlation matrix $R_{k-1}^{-1}$ obtained with respect to the previous symbol timing k−1. Furthermore, the computing part 27 calculates Eq. (6) by the use of the results of the calculations to obtain a (2g+2)L by (2g+2)L extended inverse correlation matrix $R_{k,k+1}^{-1}$; its lower right (2g+1)L by (2g+1)L partial matrix is set to $Q_k$, then $q_k^H$, $q_k$ and $q_{k,k}$ are obtained from the upper right L by (2g+1)L partial matrix, the lower left (2g+1)L by L partial matrix and the upper left L by L partial matrix and they are used to calculate Eq. (15) to obtain the inverse correlation matrix $R_k^{-1}$. The inverse correlation matrix thus obtained is provided to the multiplier 25, wherein it is multiplied by (2g+1) despread output vectors inputted as in the case of the first receiving method. Then, respective elements of an estimated vector $b(k)'=[b_1(k)', b_2(k)', \ldots, b_L(k)']^t$ in the multiplied outputs are decided by the decider 28 to obtain outputs from the L communicators at the k-th symbol timing.

As described above, according to the present invention, signals spectrum-spread by the short- and long-period spreading code sequences can also be received through decorrelation.

Next, a description will be given of the results of computer simulations carried out to demonstrate the effectiveness of the present invention. In the simulations the primary modulation was BPSK. A Gold sequence (process gain=31) of a 31-chip length was used as the short-period spreading code sequence and a Gold sequence of a 511-chip length was used as the long-period spreading code sequence. g=4 and the number L of simultaneous communicators was five; provision was made to receive signals from all the communicators with the same amplitude. The communications were conducted in an asynchronous CDMA environments.

Figure 6:
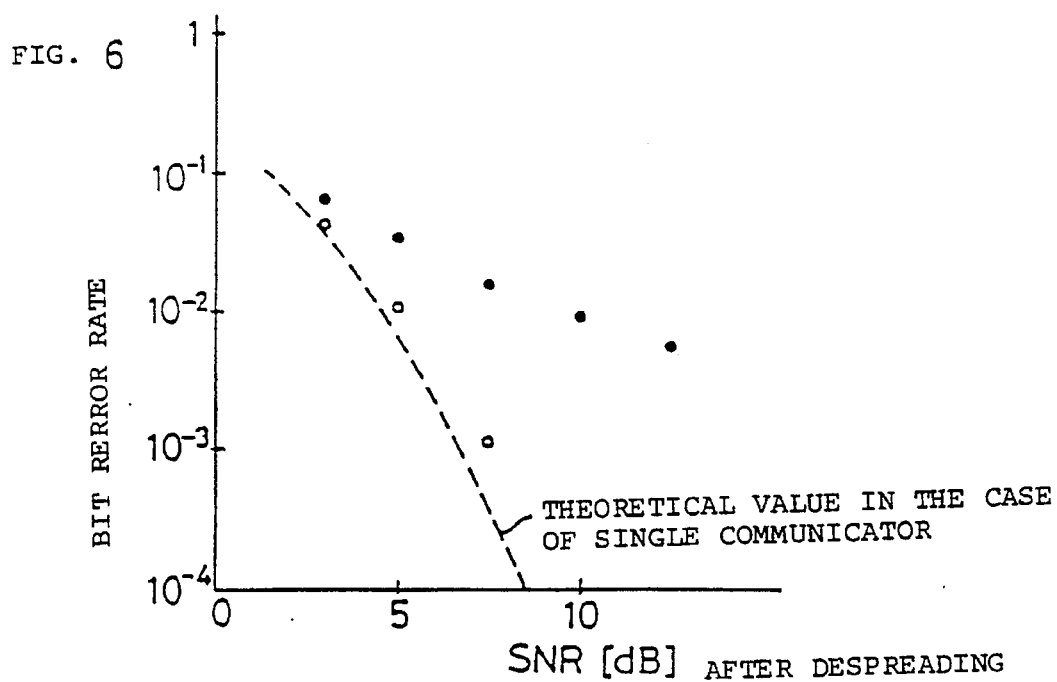
FIG. 6 is a graph showing one example of the results of simulations on the reception by the method of this invention and a conventional method.

FIG. 6 shows the results of the simulations, the abscissa representing the signal power vs. noise power (SNR) after despreading, and the ordinate the error rate. The black circles indicate the receiving characteristic by the conventional matched filter, and the white circles indicate the receiving characteristic by the present invention. The broken line indicates a theoretical value in the case of a single communicator. The error rate of the reception by the conventional matched filter which is affected by interference is appreciably degraded as compared with the error rate in the case of the single communicator, whereas the characteristic of the receiving method of the present invention substantially agrees with the theoretical value in the case of the single communicator.

Figure 7:
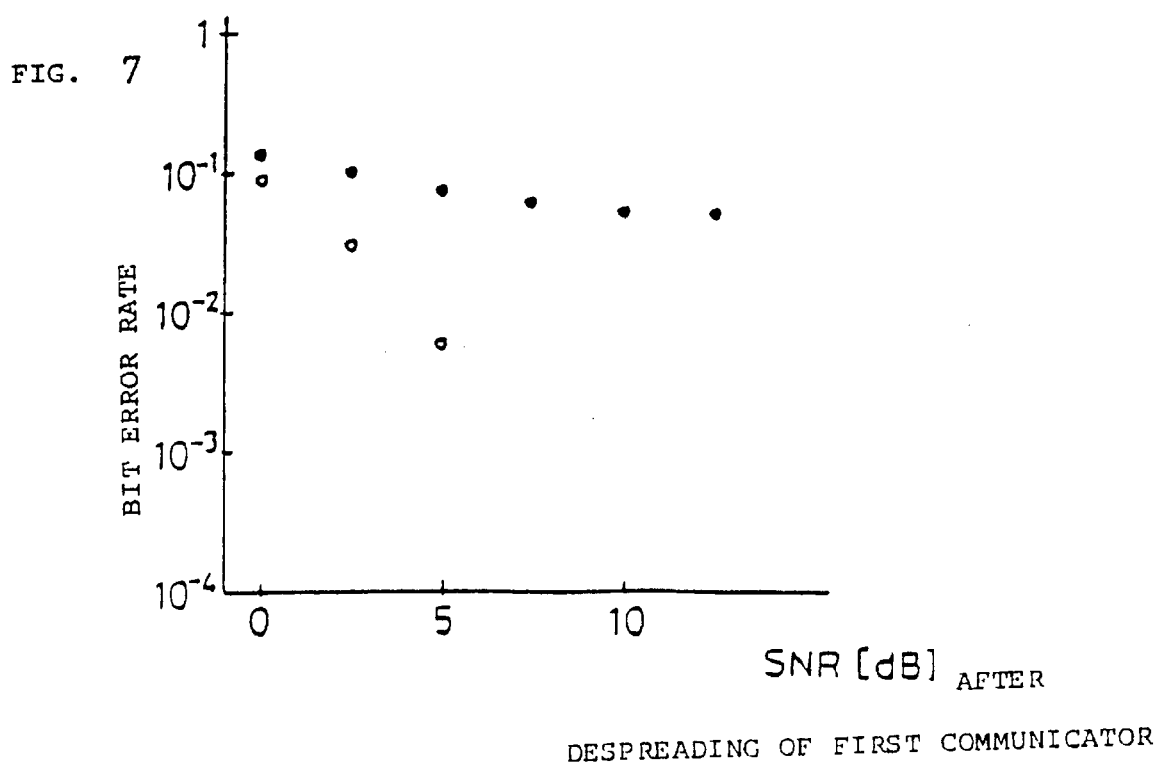
FIG. 7 is a graph showing another example of the results of simulations on the reception by the method of this invention and a conventional method.

FIG. 7 similarly shows the results of simulations. In this instance, the number L of simultaneous communicators is two and the received power of a second communicator is set higher than that of the first communicator by 10 dB. This situation can be said to be the environment of a typical near-far problem. The abscissa represents the signal power vs. noise power (SNR) after despreading for the first communicator and the ordinate represents the error rate of the first communicator. The black circles indicate the receiving characteristic by the conventional matched filter and the white circles indicate the receiving characteristic by the present invention. As will be seen from FIG. 7, the error rate characteristic of the matched filter is remarkably degraded as compared with that in the case of the single communicator by the influence of the near-far problem, whereas the characteristic by the receiving method of the present invention is free from the influence of the near-far problem.

I claim:

1. A code division multiplex signal receiving method which receives from L communicators, L being an integer equal to or greater than 2, signals each spectrum-spread with short- and long-period spreading code sequences and separates at least one of the received signals, said receiving method comprising the following steps:
   (a) said received signals are despread with spreading code sequences for said L communicators, respectively, to obtain L output sequences;
   (b) partial correlation matrixes $R^{k+h}(1)$, $R^{k+h}(0)$ and $R^{k+h}(-1)$ in L×L dimensions, representing the cross correlation of the spreading code sequences of said L communicators at respective symbol timings in the range of from (k−g)th to (k+g)th ones of k symbol timings, are calculated for h=−g, . . . , 0, . . . , g, k being a given integer and g a fixed constant equal to or greater than 1, then a correlation matrix $R_k$ composed of the partial correlation matrixes in the range of said symbol timings, is generated and its inverse correlation matrix $R_k^{-1}$ is calculated;
   (c) said inverse correlation matrix $R_k^{-1}$ is multiplied by vectors of said L despread output sequences, at said (k−g)th to (k+g)th symbol timings, obtained in said step (a); and
   (d) a decision is made of a symbol with respect to the results of said multiplication corresponding to at least one of said L communicators in said step (c).

2. The receiving method of claim 1, wherein said correlation matrix $R_k$ at a k-th symbol timing in said step (b) is calculated by the following equation:

$$R_k = \begin{bmatrix} R^{k-g}(0) & R^{k-g}(-1) & 0 & \cdots & \cdots & \cdots & 0 \\ \cdot & \cdot & \cdot & \cdot & & & \cdot \\ \cdot & \cdot & \cdot & \cdot & \cdot & & \cdot \\ \cdot & \cdot & \cdot & \cdot & \cdot & & \cdot \\ 0 & R^{k-1}(1) & R^{k-1}(0) & R^{k-1}(-1) & 0 & & 0 \\ 0 & 0 & R^k(1) & R^k(0) & R^k(-1) & 0 & 0 \\ 0 & 0 & R^{k+1}(1) & R^{k+1}(0) & R^{k+1}(-1) & 0 \\ \cdot & & \cdot & \cdot & \cdot & \cdot & \cdot \\ \cdot & & & \cdot & \cdot & \cdot & \cdot \\ \cdot & & & & \cdot & \cdot & \cdot \\ 0 & \cdots & \cdots & \cdots & 0 & R^{k+g}(1) & R^{k+g}(0) \end{bmatrix}$$

3. The receiving method of claim 1, wherein the process of calculating said inverse correlation matrix $R_k^{-1}$ at each symbol timing k+1 after the symbol timing when said inverse correlation matrix was calculated in said step (b) comprising the following steps:
   (i) partial correlation matrixes $R^{k+g}(-1)$ and $R^{k+g+1}(0)$ and said inverse correlation matrix $R_k^{-1}$ calculated at the symbol timing k are used to generate from said inverse correlation matrix an inverse correlation matrix $R_{k,k+1}^{-1}$ extended therefrom by one symbol timing; and
   (ii) said inverse correlation matrix $R_k^{-1}$ at the symbol timing k+1 is calculated from said extended inverse correlation matrix $R_{k,k+1}^{-1}$.

4. The receiving method of claim 3, wherein the process of generating said extended inverse correlation matrix $R_{k,k+1}^{-1}$ in said step (i) is a process of calculating the following equation:

$$R_{k,k+1}^{-1} = \begin{bmatrix} R_k^{-1} + R_k^{-1} r_k s_k r_k^H R_k^{-1} & -R_k^{-1} r_k s_k \\ -s_k^H r_k^H (R_k^{-1})^H & s_k \end{bmatrix}$$

where $$r_k = \begin{bmatrix} 0 \\ \cdot \\ \cdot \\ \cdot \\ 0 \\ R^{k+g}(-1) \end{bmatrix}$$

$$s_k = [R^{k+g+1}(0) - r_k^H R_k^{-1} r_k]^{-1}.$$

5. The receiving method of claim 4, wherein the process of calculating said inverse correlation matrix $R_k^{-1}$ at the symbol timing k+1 from said extended inverse correlation matrix $R_{k,k+1}^{-1}$ in said step (ii) is a process wherein, setting an equation representing said extended inverse correlation matrix to the following equation:

$$R_{k,k+1}^{-1} = \begin{bmatrix} q_{k+1,k+1} & q_{k+1}^H \\ q_{k+1} & Q_{k+1} \end{bmatrix}$$

and setting the lower right (2g+1)L by (2g+1)L partial matrix, the upper right L by (2g+1)L partial matrix, the lower left (2g+1)L by L partial matrix and upper left L by L partial matrix in said extended inverse correlation matrix calculated in said step (i) to $Q_{k+1}, q_{k+1}^H$, $q_{k+1}$, and $q_{k+1,k+1}$, respectively, said inverse correlation matrix is calculated by the following equation:

$$R_{k+1}^{-1} = Q_{k+1} - q_{k+1} q_{k+1,k+1}^{-1} q_{k+1}^H$$

6. The receiving method of claim 1 or 3, wherein said partial correlation matrix at the symbol timing k is given by the following equation:

$$R_{ij}^k(m) = \int s_i^k(t-\tau_i) s_j^{*k}(t+mT-\tau_j) dt, \quad m=-1,0,1$$

where $\int$ is an integration from $-\infty$ to $\infty$ of time t, $s_i^k(t)$ is a spreading code sequence of an i-th communicator at a k-th symbol timing and is 0 except in a symbol duration defined by a time duration [(k−1)T, kT], T being a symbol length, $\tau_i$ is a relative delay time of the received signal from said i-th communicator and * is a complex conjugate.

* * * * *